Dec. 31, 1940.    H. F. TÖNNIES    2,227,166
PHOTOELECTRIC EXPOSURE METER
Filed Nov. 2, 1937
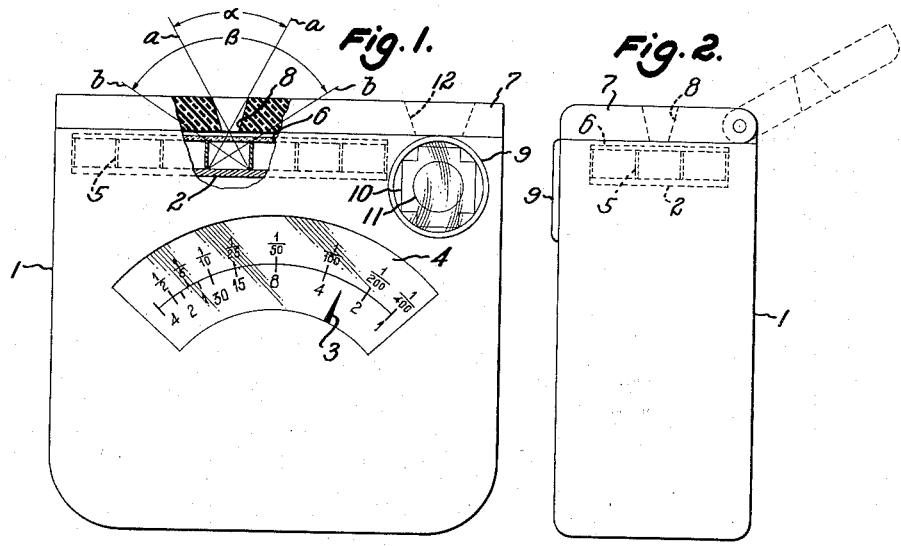
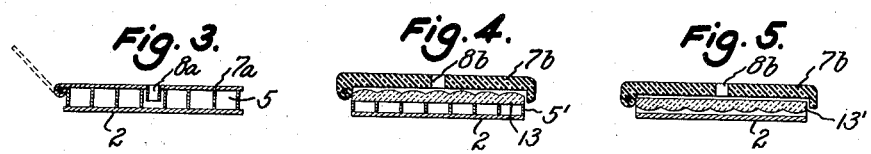
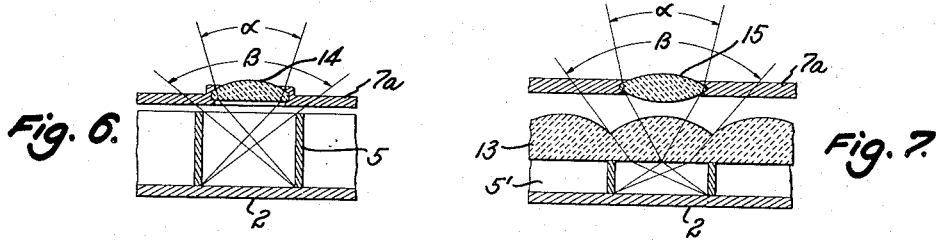
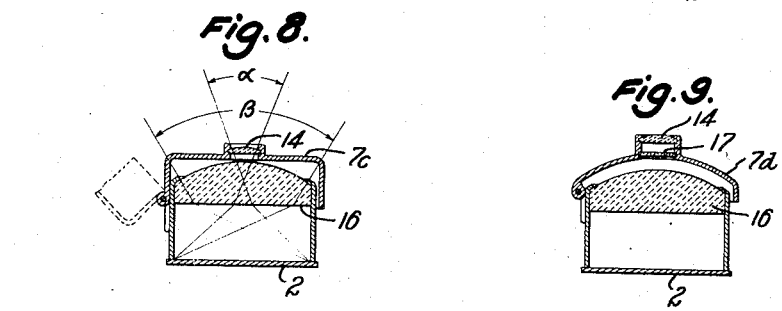
Inventor:
Hans H. Tönnies,
By Potter, Pierce & Scheffler,
Attorneys.

Patented Dec. 31, 1940

2,227,166

UNITED STATES PATENT OFFICE 2,227,166

PHOTOELECTRIC EXPOSURE METER

Hans Ferdinand Tönnies, Hamburg-Grossflottbek, Germany

Application November 2, 1937, Serial No. 172,491
In Germany October 12, 1936

10 Claims. (Cl. 88—23)

This invention relates to photoelectric exposure meters, and particularly to exposure meters having a plurality of measuring ranges.

Single range exposure meters of the type including a current-generating photocell and a sensitive measuring instrument have been open to one or the other of two objections depending upon the measuring angle or acceptance angle over which light rays reach the photocell. Such exposure meters have been too insensitive for the determination of exposure data for a dimly lighted scene when the acceptance angle of the photocell was equal to or less than the image angle of the average camera. It has been proposed to extend the measuring range to lower brightness values by increasing the acceptance angle of the photocell to a value substantially greater than the average camera angle. This affords a satisfactory solution for the problem of increasing the exposure meter sensitivity for low brightness values as a dimly lighted picture area is usually of low brightness contrast and will not differ materially, as to average brightness, from the adjacent areas that will not appear in the picture. Unfortunately, however, this expedient results in faulty indications in the determination of exposure data for a brightly lighted scene in which the average brightness of the picture area differs materially from that of the adjacent areas that fall within the wide measuring angle. This condition occurs frequently in outdoor work in bright sunlight as the large measuring angle may include sky, a light foreground of sand or stone, or sunlighted white walls that are not within the picture area.

It has been customary to design a photoelectric exposure meter for two measuring ranges, but the same objections of low sensitivity or alternatively of false readings at high brightness values have been characteristic of those prior exposure meters that employed the same measuring or acceptance angle for both measuring ranges.

According to this invention, the exposure meter includes adjustable mechanism for changing the measuring range of the exposure meter and for simultaneously changing the measuring angle. Each measuring range has its individual measuring angle, and the measuring angles become smaller with an increase in the bright range. High sensitivity is thus obtained at low brightness values by employing a measuring angle that is substantially larger than the average camera angle, and high accuracy is obtained at a higher brightness range by decreasing the measuring angle to a value equal to or less than the image angle of the average camera. There is wide latitude in the extent to which the measuring angle may be reduced at a higher measuring range since, with an exposure meter having two measuring ranges, the measured values corresponding to equal pointer displacements in the two ranges may be related in the ratio of 1 to 200 or more. It is not desirable, in general, to effect the entire range change adjustment by altering the measuring angle as false results may be expected when using a relatively small measuring angle that includes but a minor part of the complete picture area.

An object of this invention is to provide a photoelectric exposure meter including a photoelectric cell and a measuring instrument within a relatively flat casing of approximately rectangular shape; the cell being spaced from the narrow front wall of the casing by a main baffle that admits light rays to the cell over a relatively large measuring or acceptance angle, and an apertured cover being hinged to the casing for movement into closed position in front of the cell and main baffle to reduce the acceptance angle of the cell and condition the exposure meter for a higher measuring range. An object is to provide an exposure meter of the type stated in which the apertured cover, when turned into operative position, reduces both the acceptance angle and the effective area of the cell. A further object is to provide a double range exposure meter including an adjustable baffle for changing the measuring angle of the exposure meter, and a view finder bearing markings indicative of the fields falling within the respective measuring angles.

These and other objects and advantages of the invention will be apparent from the following specification when taken with the accompanying drawing in which:

Figs. 1 and 2 are a top plan view and a side elevation, respectively, of an exposure meter embodying the invention;

Figs. 3, 4 and 5 are fragmentary sectional views illustrating other structural forms for the main baffle and the auxiliary range-changing baffle;

Figs. 6 and 7 are fragmentary sectional views, on an enlarged scale, of constructions in which a lens is included in the auxiliary baffle;

Fig. 8 is a sectional view through a photocell and baffle system comprising a single lens for the main baffle and a small lens in the opening of the auxiliary baffle; and Fig. 9 is a sectional view of a similar construction in which a filter or light absorbing plate is included in the auxiliary baffle.

In the drawing, the reference numeral 1 identifies the approximately rectangular and flat casing within which the photocell 2 and the measuring instrument are housed. The instrument is of the conventional sensitive milliammeter type and includes a pointer 3 that is displaced with respect to the double range scale plate 4 by a pivoted coil, not shown, that is connected to the photocell. The pointer and scale plate are exposed to view through a window opening in the flat top wall of the casing 1. Some known form of computer will be provided for adjusting the scale plate angularly in accordance with selected values of exposure factors such as film speed and diaphragm opening or for correlating the instrument reading from a fixed scale plate with the selected exposure factor values. The computer mechanism forms no part of the present invention and, for simplicity of illustration, has been omitted from the drawing.

The photocell 2 is adjacent the narrow front wall of the casing and receives light rays through the multi-compartment baffle 5 and the cover glass 6 that extends across the light-admitting opening in the end wall to protect the photocell from moisture and dust. The range-changing system comprises an auxiliary baffle that may be placed over the main baffle 5 to screen off all but a desired small fraction of the light energy arriving at the front wall of the casing over the measuring angle determined by the main baffle. The casing cover 7 is employed as the auxiliary baffle, and preferably takes the form of an opaque plate that is hinged to the casing along the lower edge of the front wall and has one or more transverse openings 8 for admitting light to the photocell when in closed position. The range-changing factor is determined by the size and the geometry of the opening or openings 8 in the cover 7 and, for the illustrated low and high range scales of Fig. 1, the auxiliary baffle will be designed to transmit only 1/400 of the light energy admitted by the main baffle 5 when the cover 7 is turned down into inoperative position.

The light-obstructing action of the apertured cover 7 is due in part to the substantial reduction in the transverse dimensions of the effective light path since the open end of the aperture 8 is substantially smaller than the aggregate cross-sectional area of the main baffle 5. A further screening action is obtained, in accordance with this invention, by so relating the diameter of the outer end of the aperture 8 to the thickness of the cover 7 that the outer light rays $a$ which may reach the photocell 2 through the aperture 8 subtend a measuring angle $\alpha$ that is substantially smaller than the measuring angle $\beta$ between the outer rays $b$ that are admitted to the photocell 2 by the main baffle 5 when the cover 7 is in inoperative position. The measuring angle $\beta$ is preferably made substantially larger than the image angle of the average camera to obtain high sensitivity in the lower measuring range, and the measuring angle $\alpha$ may be equal to or preferably less than the average camera image angle to restrict the measurements on the higher brightness range to light rays reflected from only the pictorially important portion of the scene to be photographed.

A view finder 9 is mounted within the casing 1 to provide an image of the field included within the measuring angle of the exposure meter when the cover 7 is turned back into inoperative position. The outline 10 of an area defined by crossed rectangles may be etched or otherwise marked on the ground glass or objective lens of the view finder to indicate the portion of the larger measuring field that is included within the picture area of an average camera having an oblong picture area of the order of 2¼ by 3¼ inches, and a circle 11 is etched or marked on the view finder to indicate that portion of the field which is included within the smaller measuring angle at the higher brightness range. The operator can thus include the more important portion of the scene within the measuring angle when the exposure meter is used to determine exposure data for a brightly lighted scene. The cover 7 is provided with an opening 12 for admitting light rays to the view finder when the cover is closed upon the casing.

There is considerable latitude in the design of both the main and auxiliary baffles of exposure meters embodying the invention. As shown in Fig. 3, the cover 7a of the exposure meter casing may be a metal plate and the light-transmitting opening 8a may take the form of a tube that extends into one of the compartments of the mechanical baffle 5 when the cover is in closed position. The main baffle may be formed by a lenticular plate 13 and mechanical compartment baffle 5' of short axial length, as shown in Fig. 4, and the opening 8b in a relatively thick cover 7b may be substantially cylindrical. As shown in Fig. 5, the main baffle may be a lens plate 13' that is sufficient, without a mechanical baffle element, to restrict the larger measuring angle to a desired value.

As shown in Fig. 6, a plano-convex lens 14 may be mounted in an opening in a cover 7a to reduce the acceptance or measuring angle of the photocell 2 to a value substantially lower than that determined by a main baffle 5 of mechanical multiple-compartment type. When the main baffle includes a lenticular plate 13 and short mechanical baffle 5', as in Fig. 7, a double convex lens 15 may be placed in an opening in the cover plate 7a to reduce the measuring angle of the exposure meter.

The main baffle system may comprise a single lens 16, as shown in Figs. 8 and 9, for determining the larger measuring angle that is employed at the lower measuring range, and the pivoted cover 7c may have a small lens 14 mounted in an opening to cooperate with lens 16 to reduce the measuring angle when the cover is turned into operative position in front of the lens 16. A filter or light absorbing plate 17 may be used with the lens 14 in the aperture of a cover plate 7d, Fig. 9, to increase the range-multiplying action of the cover plate.

The optical baffle systems of Figs. 6 to 9 are designed to alter the measuring angle of the exposure meter with a change in the measuring range. The paths of the outer light rays that reach the photocell 2 over the measuring angles $\alpha$ and $\beta$, respectively, are illustrated in the several views.

For simplicity of illustration, only a single light-transmitting aperture has been shown in the hinged cover but it will be apparent that a plurality of light-transmitting apertures may be employed. A plurality of auxiliary baffles may be employed to provide more than two measuring ranges, and the described embodiments of the invention are therefore to be construed as indicative of the scope of an invention that is not limited to the particular constructions herein illustrated and described. The selection of the measuring angles for the different measuring ranges permits considerable latitude in the design or multiple range exposure meters and it is to be understood that various modifications of the described constructions fall within the spirit of my invention as set forth in the following claims.

I claim:

1. A photoelectric exposure meter comprising a flat, approximately rectangular casing having a narrow front wall, a measuring instrument within said casing, said instrument having a plurality of scales graduated in values of an exposure factor and a pointer movable along said scales, a photoelectric cell within said casing and spaced inwardly from the narrow front wall, means in said casing for restricting the acceptance angle of the cell to a relatively large value and a casing cover movable to overlie said cell, said cover having a light-transmitting opening therethrough for admitting to a limited area of said cell light rays arriving within a relatively small acceptance angle, said instrument scales being graduated in different ranges of exposure factor values corresponding respectively to pointer displacement when said cover overlies and is removed from said cell.

2. In an exposure meter, a photoelectric cell, a casing housing said cell, optical refractive means carried by said casing and limiting the acceptance angle of the cell to a large value, a casing cover movable to overlie said means, said cover being opaque and having a small opening therethrough, and a lens in said opening cooperating with said optical refractive means to reduce the acceptance angle of the cell to a substantially smaller value.

3. The invention as claimed in claim 2, in combination with a light obstructing plate on said cover to reduce the transmission of light through said opening.

4. A photoelectric exposure meter comprising a measuring instrument having a pointer movable over a double range scale, a photoelectric cell connected to said instrument, a casing housing said instrument, baffle means adjustable to admit light rays to said cell over two substantially different acceptance angles for which said instrument pointer cooperates with the respective scale ranges, and a view finder carried by said casing for producing an image of the field included within the larger acceptance angle, said view finder including means indicating the portion of said field that falls within the smaller acceptance angle.

5. A photoelectric exposure meter comprising a measuring instrument having a pointer movable over a scale graduated in two ranges of an exposure factor, a photoelectric cell connected to said instrument, a casing for said cell, means restricting the acceptance angle of the cell to a relatively large angle for which said pointer cooperates with one range scale of graduations, a cover pivoted to said casing for movement into positions overlying and remote from said cell, said cover having an opaque section for blocking light from a portion of said cell and a light-transmitting opening for admitting light to said cell over a small acceptance angle for which said pointer cooperates with the other range scale of graduations, a view finder carried by said casing for producing an image of the field included within the larger acceptance angle, said view finder including means indicating the portion of said field that falls within the smaller acceptance angle.

6. An exposure meter comprisng a flat, approximately rectangular casing having a narrow front wall, a cover for said narrow front wall and pivotally mounted at a long edge of that wall, a photocell within said casing and spaced from said front wall by baffle means restricting the acceptance angle of the cell to a relatively large value, said cover having means comprising a light-transmitting opening for admitting light rays to said photocell over a relatively small angle when said cover is closed upon said casing, a measuring instrument within said casing and connected to said photocell, said instrument including a pointer movable over a scale plate exposed to view through the top wall of said casing, and said scale plate carrying two sets of graduations of an exposure factor for cooperation with said instrument pointer when said casing cover is in closed or alternatively in open position.

7. An exposure meter as claimed in claim 6, wherein said casing cover is provided with a lens for cooperation with the light-transmitting opening of the cover to restrict the acceptance angle of the exposure meter to its lower value.

8. In a photoelectric exposure meter, a flat casing having a narrow front wall with a light permeable opening therein, a photoelectric cell within said casing at the front wall portion thereof, a measuring instrument in said casing and electrically connected to said cell, said instrument having a pointer and scale plate visible at the top wall of the casing, baffle means restricting the angular spread of light rays reaching said cell through said front wall to a relatively large value, and auxiliary baffle means movable into position to reduce the angular spread of light rays reaching said cell to a substantially lower value; said auxiliary baffle means comprising a cover member hinged to said casing at a long edge of said front wall.

9. In a photoelectric exposure meter, the invention as claimed in claim 8, wherein said cover has an opening therethrough for admitting light to said cell when the cover is in closed position over the front wall of said casing.

10. In a photoelectric exposure meter, the invention as claimed in claim 8, wherein said cover has an opening therethrough for admitting light to said cell when the cover is in closed position over the front wall of said casing, and a lens is mounted in said opening.

HANS FERDINAND TÖNNIES.